United States Patent [19]

Majlinger

[11] 4,215,149

[45] Jul. 29, 1980

[54] PROCESS FOR IMPROVING THE PALATABILITY OF PET FOOD

[75] Inventor: Thomas J. Majlinger, Wilton, Conn.

[73] Assignee: Standard Brands Incorporated, New York, N.Y.

[21] Appl. No.: 961,571

[22] Filed: Nov. 17, 1978

Related U.S. Application Data

[63] Continuation-in-part of Ser. No. 853,013, Nov. 17, 1977, abandoned, which is a continuation-in-part of Ser. No. 670,028, Mar. 24, 1976, abandoned.

[51] Int. Cl.$^2$ ............................................. A23K 1/00
[52] U.S. Cl. ..................................... 426/292; 426/98; 426/307; 426/623; 426/805

[58] Field of Search ................. 426/89, 302, 307, 623, 426/630, 635, 805, 292

[56] References Cited

U.S. PATENT DOCUMENTS

| | | | |
|---|---|---|---|
| 3,115,409 | 12/1963 | Hallinan et al. | 426/641 |
| 3,679,429 | 7/1972 | Mohrman | 426/805 |

*Primary Examiner*—R. B. Penland

[57] ABSTRACT

A process is provided for preparing dry pet food having on its surface a salt of phosphoric acid. The improved palatability imparted to the pet food by the salt is maintained on storage.

5 Claims, No Drawings

PROCESS FOR IMPROVING THE PALATABILITY OF PET FOOD

CROSS-REFERENCE

This is a continuation-in-part of patent application Ser. No. 853,013 filed Nov. 17, 1977, abandoned, which is a continuation-in-part of patent application Ser. No. 670,028 filed Mar. 24, 1976 abandoned.

BACKGROUND OF THE INVENTION

1. Field of the Invention

This invention relates to a process for improving the palatability of dry pet food. More particularly, this invention relates to a process for enhancing the flavor of dry pet food which has been stored so that the acceptance thereof by cats is increased.

It should be understood that the expression "dry pet food," as used herein, includes such foods having a low moisture content as distinguished from pet foods having intermediate or relatively high moisture contents. Pet foods having intermediate moisture levels generally contain from about 20 to 40 percent moisture. For bacteriostatic purposes, such pet foods are formulated to contain relatively high levels of water soluble solids, e.g., sugars, polyglycol alcohols, salt, etc. in order to bind the free water present and also a low pH level is provided in the pet food. Dry pet foods, on the other hand, are formulated to contain less than about 15 percent moisture and the free water content is generally insufficient to support the growth of contaminating microorganisms.

Dry pet foods exhibit a number of advantages over pet foods having higher moisture contents. The dry foods are generally more nutritious on an equal weight basis, require less expensive packaging, have better keeping qualities and are more convenient to use.

Domestic animals, particularly cats, are notoriously fickle in their food preferences. As a result, their owners frequently change types and brands of cat food in order to maintain their pets in a healthy and contented condition. For the most part, the only way to determine the gastronomic preferences of cats is by trial and error.

2. Description of the Prior Art

There are a number of processes disclosed in the art for improving the palatability and other characteristics of dry pet food. U.S. Pat. No. 3,115,409 to Hallinan et al. is directed to pet foods having a high acid content and a minimum disclosed moisture content of 30 percent. The pH of the pet food is adjusted to low levels and then the pet food is cooked to alter the proteinaceous material contained therein. This type of procedure is commonly practiced in the food industry to inhibit bacterial decomposition and to hydrolyze proteinaceous materials in order to develop more flavorful products. In order for the reaction to take place, relatively large quantities of water are necessary. U.S. Pat. No. 3,139,342 to Linskey relates to an animal food process wherein the food is produced in the form of pellets which may be coated with various taste enhancing and/or nutrition supplementing materials, e.g., fat and Vitamin A. U.S. Pat. No. 3,203,806 to Young relates to a pet food having acetamide and acetic acid incorporated therein for improved palatability. The palatability improvers may be added to dry or semi-dry pet foods by being sprayed thereon. U.S. Pat. No. 3,539,357 to Appleman et al. relates to a method of preparing animal food having a relatively high moisture content whereby heated meat tissue is treated with an acid to produce a breakdown of the proteins and comminuting the treated material. U.S. Pat. No. 3,615,647 to Kassens is directed to a porous, expanded animal food in the form of chunks coated with fat which coating is, in turn, overlaid with a coating of dextrin. U.S. Pat. No. 3,679,492 to Mohrman et al. relates to a method for improving the palatability of dry cat food by coating particles of the food with fat and a flavor enhancing acid, specifically, citric, phosphoric or hexamic acids. U.S. Pat. No. 3,708,306 to Appleman relates to a pet food containing psyllium byproducts wherein dicalcium phosphate is incorporated. The dicalcium phosphate is blended into the pet food together with other ingredients in the form of a batter which is then baked. U.S. Pat. No. 3,930,031 to Kealy is directed to a cat food composition having a coating comprising a flavor enhancing mixture of phosphoric and citric acids.

In general, cats seem to exhibit a preference for foods having an acidic reaction. The degree of acceptance of a food is apparently determined largely through the cats' highly developed sense of smell. Materials applied to the surface of dry pet food affect its acceptance by cats to a greater degree than do the same materials incorporated into the body of the food. Presumably, this is due to the fact that the cats' olfactory organs can more readily detect the smell of these materials when such are on the surface of the food.

The application of certain acids to the surface of dry cat food, while apparently having a positive effect on palatability, is not entirely satisfactory. Such acids present handling problems and, since they are corrosive, expensive equipment must be used in processes employing the same. Moreover, since the acids are applied in liquid form, they may diffuse into the body of the food upon storage, thus reducing their effect on palatability and acceptance.

OBJECTS OF THE INVENTION

It is a principal object of the present invention to provide a process for improving the palatability of dry pet food which has been stored.

It is yet another object of the present invention to provide a process for improving the palatability of pet food to cats which does not require expensive processing equipment.

It is still another object of the present invention to provide pet food which has been stored having improved palatability to cats.

These and other objects of the present invention will be apparent from the following specification and the appended claims.

SUMMARY OF THE INVENTION

A process is provided for maintaining the palatability of particulate pet food which has been stored. A salt selected from the group consisting of mono-alkali and mono-alkaline earth metal salts of phosphoric acid is applied to the surface of the particulates and maintained intact thereon. The amount of salt applied is sufficient to provide a pH of from about 4.5 to about 5.5 in a 10 percent aqueous slurry of the pet food.

DETAILED DESCRIPTION OF THE INVENTION

The amount of the salt of phosphoric acid applied to the surface of the pet food to enhance the flavor thereof will vary depending, inter alia, on the composition of the food and the particular salt utilized. Typically, the amount used is such that a 10 percent aqueous slurry of the food will have a pH in the range of from about 4.5 to about 5.5. The preferred pH is about 5.2. Generally, the amount of the applied salt will be in the range of from about 0.25 to about 2.0 percent, by weight, the preferred amount being about 0.75 percent.

It is contemplated that the food to which the salt of phosphoric acid is applied will most suitably be in bite size, particulate form, such as pellets and the like. The salt may be applied to dry pet food having any shape or form, however, the only requirement being that at least a portion of the surface of the food has the salt applied thereto. Although the present invention is principally directed to the use of salts of phosphoric acid to improve the palatability of dry pet food and increase its acceptance by cats, other materials which together with the phosphoric acid salts impart the set forth acidity may be used, e.g., various other edible acid salts.

The surface of the pet food may also be treated with other flavor enhancing materials and materials conventionally used in preparing pet foods. Typically, the pet food will be coated with fat, e.g., animal tallow, and/or with flavorings, e.g., meat or cheese flavors and the like. Proteins, carbohydrates and other fats from both animal and vegetable sources, minerals, vitamins, preservatives etc. may also be applied.

Dry pet foods may be prepared by a variety of methods. One such method which is widely used on a commercial basis is the cooker-extruder method wherein the ingredients are first blended and moistened to provide an extrudable mixture. The mixture is then fed into an apparatus wherein it is heated and extruded in the form of particulates which are then dried. Generally, drying is carried out to provide a product containing less than about 15 percent moisture and preferably dried to a moisture level in the range of from about 9 to about 12 percent.

The salt of phosphoric acid may be applied to the surface of the pet food in any convenient manner, such as spraying, dusting and the like, so that the salt is applied to at least a portion of the food. Generally, the acid salt will be applied to the pet food after such is coated with a fat so the desired degree of adhesion will be obtained. Conveniently, the food, carried on a moving belt, passes beneath a hopper from which metered amounts of the salt are deposited on the surface of the food. The process of the present invention may be carried out in a batch or continuous manner.

It is critical that the coated particulates not be cooked or otherwise subjected to an overt heat treatment. Otherwise, it is possible that reaction between the salts and certain of the other constituents of the pet food may occur which would diminish the palatability of the pet food on storage. In other words, the salts are maintained intact on the surface of the particulates and there is no transfer or absorption thereof through the surface of the particulates upon storage which diminishes their desirable initial impact on cats and also results in some alteration of the constituents of the pet food. Providing an intervening fat coating between the surface of the food and the salts also prevents reaction of the salts with the food ingredients.

In order to more clearly describe the nature of the present invention, specific examples will hereinafter be described. It should be understood, however, that this is done solely by way of example and is intended neither to delineate the scope of the invention nor limit the ambit of the appended claims.

EXAMPLE I

This Example illustrates a continuous process for producing dry pet food having enhanced palatability to cats by applying to the surface of the food a salt of phosphoric acid.

Dry pet food ingredients comprising poultry by-products, ground corn, wheat flour, fat, corn gluten meal, salt, cheese powder, whole egg, dried milk, organ meats and vitamin and mineral supplements were blended. The blended ingredients were moisturized and steam conditioned to a moisture content of about 30 percent in the pre-cooker section of an expander cooker-extruder. The moisturized pet food was then metered into the cooker-extruder and extruded through appropriately shaped dies to provide pieces having the desired shape and size. The shaped pieces were dried to a moisture content of less than about 12 percent, cooled and spray-coated with fat in a revolving cylinder. The fat coated pieces were then placed on a moving belt which passed beneath a hopper containing crystalline monosodium phosphate from which a sufficient amount of the phosphate salt was deposited onto the surface of the food to provide a concentration thereon of about 0.5 percent monosodium phosphate based on the weight of the food.

EXAMPLE II

This Example illustrates the effect on acceptability by cats of applying a salt of phosphoric acid to the surface of dry pet food and compares the acceptability of such food with that of a commercial dry cat food having phosphoric acid on its surface.

Dry pet food was prepared as shown in Example I but with sufficient amounts of salts of phosphoric acid applied to the surface or portions thereof to provide the following, based on the weight of the food:
A—0.25 percent monosodium phosphate
B—0.5 percent monosodium phosphate
C—1.0 percent monocalcium phosphate Groups of 8 to 10 cats were individually housed and provided with separate feed pans containing weighed amounts of the commercial cat food and one of the phosphate salt treated cat foods enumerated above. The cats were allowed free choice of the cat foods for a period of 24 hours. The pans were then removed from the cages and the amounts of each food consumed by each cat were determined. The above procedure was then repeated for a second 24 hour period. The combined results of the two day feeding tests are shown in Table I below:

TABLE I

Average Consumption of Food by Cats in Paired Feeding Tests (oz/cat/day)

| | FOOD PROVIDED | | |
|---|---|---|---|
| Commercial Cat Food* | A (0.25% $NaH_2PO_4$) | B (0.5% $NaH_2PO_4$) | C (1.0% $Ca(H_3PO_4)_3$) |
| 1.94 | 1.50 | | |
| 1.31 | | 1.58 | |
| 1.30 | | 1.50 | |
| 1.22 | | | 1.44 |

*coated with sufficient phosphoric acid to provide 0.5% phosphoric acid thereon

The data in the above Table show that, in general, the cats in the paired feeding tests showed a preference for the pet food prepared by the process of the present invention.

EXAMPLE III

This example illustrates the storage stability of dry pet food which has been surface treated with a salt of phosphoric acid and compares said storage stability with that of a commercial pet food which had been surface treated with phosphoric acid.

Twenty cats were individually housed and provided with separate feed pans containing weighed amounts of dry pet food coated with sufficient sodium acid phosphate to provide 1.0 percent thereof on the surface of the food and a commercial dry pet food, respectively. The cats were allowed free choice of the pet foods for a period of 24 hours. The pans were then removed from the cages and the amounts of each food consumed by each cat were determined. The above procedure was then repeated for a second 24 hour period.

The test pet foods were stored for two months at a temperature of 85° F. and then presented to 19 of the cats in two 24 hour feeding periods identical to those described above. The results are shown in Table II below:

TABLE II

Consumption of Pet Foods by Cats Before and After High Temperature Storage

| Cat Food | Before Storage | | After storage for 2 months at 85° F. | |
|---|---|---|---|---|
| | Total Consumed oz/2 days | No. of Cats preferring* | Total Consumed oz/2 days | No. of Cats preferring |
| Commercial** | 68.5 | 7 | 39.5 | 2 |
| $NaH_2PO_4$ treated | 65.0 | 12 | 77.0 | 17 |

*one cat consumed equal quantities of both pet foods
**coated with sufficient phosphoric acid to provide 0.5% phosphoric acid thereon From the above table, it is apparent that the cats showed a strong preference for the sodium acid phosphate treated food. This preference was even more dramatically evidenced when the cats were provided with the two foods following storage thereof at two months at 85° F.

Standard analysis of variance studies were carried out on the raw data which are summarized in Table II. The results of these studies indicate that the cats showed a divided preference for the two test foods, i.e., the averages of the total amounts of each food consumed before the foods were stored were not statistically different. After the foods were stored at 85° F. for two months, however, analysis of variance of average food consumption by 19 of the cats indicated a significant preference at the 99 percent confidence level for the experimental cat food over the commercial cat food.

The terms and expressions which have been employed are used as terms of description and not of limitation. It is not intended in the use of such terms and expressions to exclude any equivalents of the features shown and described or portions thereof, since it is recognized that various modifications are possible within the scope of the invention claimed.

What is claimed is:

1. A process for maintaining the palatability of pet food which has been stored consisting essentially of extruding a moisturized mixture of pet food ingredients to form particulates, drying the particulates to a moisture content of less than about 15 percent, coating the dried particulates with fat, applying to the fat coated surface of the particulates from about 0.5 to about 2 percent, by weight, of an intact salt selected from the group consisting of monoalkali metal and monoalkaline earth metal salts of phosphoric acid and storing the salt coated pet food for about two months at 85° F. thereby enhancing the flavor of the food and increasing the acceptance thereof by cats.

2. A process for improving the palatability of pet food as defined in claim 1, wherein the salt of phosphoric acid is monosodium phosphate.

3. A process for improving the palatability of pet food as defined in claim 1, wherein the salt of phosphoric acid is monocalcium phosphate.

4. A process for improving the palatability of pet food as defined in claim 1, wherein the amount of the salt applied to the surface of the food is about 0.75 percent based on the weight of the food.

5. A process for maintaining the palatability of pet food as defined in claim 1, wherein the pet food has a moisture content of from about 9 to about 12 percent.

* * * * *